US012759097B2

(12) United States Patent
Cui et al.

(10) Patent No.: US 12,759,097 B2
(45) Date of Patent: Oct. 13, 2026

(54) SYSTEMS AND METHODS FOR REPAIRING MACHINED SLOTS IN GAS TURBINE COMPONENTS

(71) Applicant: GE Verona Infrastructure Technology LLC, Greenville, SC (US)

(72) Inventors: Yan Cui, Greer, SC (US); Matthew Joseph Laylock, Easley, SC (US); Michael Douglas Arnett, Simpsonville, SC (US); Brian Lee Tollison, Honea Path, SC (US); Ibrahim Ucok, Simpsonville, SC (US)

( * ) Notice: Subject to any disclaimer, the term of this patent is extended or adjusted under 35 U.S.C. 154(b) by 0 days.

(21) Appl. No.: 18/639,328

(22) Filed: Apr. 18, 2024

(65) Prior Publication Data

US 2025/0326074 A1 Oct. 23, 2025

(51) Int. Cl.
*B23P 6/00* (2006.01)
*B23K 1/00* (2006.01)
*B23P 6/04* (2006.01)
*B23K 101/00* (2006.01)
*F01D 11/00* (2006.01)

(52) U.S. Cl.
CPC ............ *B23P 6/007* (2013.01); *B23K 1/0018* (2013.01); *B23P 6/045* (2013.01); *B23K 2101/001* (2018.08); *F01D 11/00* (2013.01); *F05D 2230/237* (2013.01); *F05D 2230/80* (2013.01)

(58) Field of Classification Search
CPC ................................ B23P 6/007; B23P 6/045
See application file for complete search history.

(56) References Cited

U.S. PATENT DOCUMENTS 3,874,960 A * 4/1975 Matsuzaki ........... H02G 15/085 156/49
4,688,652 A 8/1987 Crist
4,924,581 A * 5/1990 Jakobsen ................ B23P 6/005 29/402.13

(Continued)

FOREIGN PATENT DOCUMENTS

DE 102005002609 A1 8/2006
EP 3848142 B1 7/2023

(Continued)

OTHER PUBLICATIONS

English Machine Translation of KR-101923045-B1 (Year: 2018).*
Extended European Search Report for Patent Application No. 25165800.1 dated Jan. 2, 2026; 8 pp.

*Primary Examiner* — Sarang Afzali
(74) *Attorney, Agent, or Firm* — Armstrong Teasdale LLP

(57) ABSTRACT

A repair method to provide a way to salvage mis-machined or damaged parts by repairing the parts using a combination of a fishbone braze foil and a spring-like locking insert. The method includes providing a braze foil variably sized to fit within at least a portion of a slot of a component being repaired, and positioning a locking insert proximate to the braze foil. The method also includes pressing the braze foil and the locking insert into at least the portion of the slot being repaired, such that the locking insert is securely coupled within the portion of the slot being repaired via a friction fit, and brazing the braze foil and the locking insert together in the slot. The method further includes re-machining a new slot in the component after brazing the locking insert and the braze foil.

13 Claims, 8 Drawing Sheets

(56) References Cited

U.S. PATENT DOCUMENTS

| | | | | |
|---|---|---|---|---|
| 6,609,894 | B2 * | 8/2003 | Jackson | B23P 6/005 29/889.7 |
| 7,363,707 | B2 * | 4/2008 | Powers | B23P 6/005 29/889.1 |
| 8,156,649 | B2 | 4/2012 | Simone et al. | |
| 8,235,275 | B1 * | 8/2012 | Stankowski | B23K 35/3046 228/56.3 |
| 11,097,384 | B2 * | 8/2021 | Hafner | F01D 9/04 |
| 2016/0199930 | A1 | 7/2016 | Yarbrough | |
| 2020/0384560 | A1 * | 12/2020 | Rebbecchi, Jr. | B23K 1/20 |
| 2022/0241881 | A1 * | 8/2022 | Xu | B23K 1/0008 |

FOREIGN PATENT DOCUMENTS

| | | | | |
|---|---|---|---|---|
| EP | 3178602 | B1 | 3/2024 | |
| KR | 101923045 | B1 * | 11/2018 | B23K 1/0018 |

* cited by examiner

SYSTEMS AND METHODS FOR REPAIRING MACHINED SLOTS IN GAS TURBINE COMPONENTS

BACKGROUND

The field of the disclosure relates generally to gas turbine components, and more specifically, to methods and systems for repairing machined slots in gas turbine components.

Combustion turbines, such as gas turbine engines, generally include a compressor section, a combustor section, a turbine section, and an exhaust section coupled together in a serial flow arrangement. During operation, the compressor section receives and compresses ambient air that is discharged towards the combustor section. The combustor section generally includes a plurality of combustors that receive the compressed air and mix it with fuel to form a fuel/air mixture. The mixture is combusted within the combustors to form a hot working gas that may be routed to the turbine section wherein the gas is expanded through alternating rows of stationary airfoils and rotating airfoils and used to generate power that can drive a rotor. The expanding gases exiting the turbine section can be exhausted from the engine via the exhaust section.

Effective operation of a combustion turbine is predicated upon the components functioning properly. The operation of the turbine system may be adversely affected when components fail after prolonged exposure to high temperatures, high pressures, and/or high rotational stresses, for example. Other component failures may occur if the components are not manufactured with tight tolerances and/or if the components are not accurately positioned within the combustion turbine, such as may occur if the components are not accurately machined, i.e., mis-machined, prior to installation. For example, seals used within combustion turbines may include curved surfaces and/or other surface features that may be susceptible to becoming dislodged when exposed to various forces during turbine operation. Furthermore, such seals may be more likely to fail if any portion of the seals are mis-machined, for example.

Conventionally, after such components fail or are damaged, the components are generally replaced and discarded. Removing such components often requires the turbine to be removed from service to enable a time-consuming and labor-intensive process to be performed. Moreover, discarding the otherwise functional, mis-machined parts increases the overall expense associated with replacing the component and maintaining the turbine system.

Accordingly, it would be desirable to implement repair methods and systems that enable turbine components to be repaired and/or fabricated without requiring the component to be replaced. Moreover, such methods and systems would facilitate reducing waste and expenses by reducing the likelihood that a damaged component must be discarded.

BRIEF DESCRIPTION

In one aspect, a method of repairing a component is provided. The method includes providing a braze foil variably sized to fit within at least a portion of a slot of a component being repaired, and positioning a locking insert proximate to the braze foil. The method also includes pressing the braze foil and the locking insert into at least the portion of the slot being repaired, such that the locking insert is securely coupled within the portion of the slot being repaired via a friction fit, and brazing the braze foil and the locking insert together in the slot.

In another aspect, a repair kit for use with a machined component that includes a slot, wherein at least a portion of the slot is damaged or has been mis-machined is provided. The repair kit includes a braze foil and a locking insert. The braze foil is variably sized to fit within at least a portion of the slot being repaired. The locking insert is sized to be positioned proximate the braze foil, such that when the locking insert and the braze foil are pushed into at least the portion of the slot being repaired, the braze foil extends completely across any portion of the surface defining the portion of the slot being repaired prior to the braze foil and the locking insert being brazed concurrently in the slot.

A method of repairing a turbine component is provided. The method includes providing a braze foil variably sized to fit within at least a portion of a slot defined within the turbine component being repaired, positioning the braze foil to extend across the portion of the slot to be repaired, and positioning a locking insert against the braze foil. The method also includes forcing the braze foil and the locking insert simultaneously into at the portion of the slot being repaired, such that the locking insert is securely coupled within the portion of the slot being repaired via a friction fit, and such that the braze foil extends completely across the surfaces defining the portion of the slot being repaired, and brazing the braze foil and the locking insert simultaneously in the portion of the slot being repaired.

The above brief description is provided as an overview of only some of the implementations disclosed herein. Those and other implementations are described in more detail here. In addition, some implementations may include one or more processors of one or more computing devices, wherein the one or more processors are operable to execute instructions stored in associated memory, and wherein the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

The above mentioned, and other features of this invention will become more apparent and the invention itself will be better understood by reference to the following description of embodiments of the invention taken in conjunction with the accompanying drawings, wherein.

Figure 1:
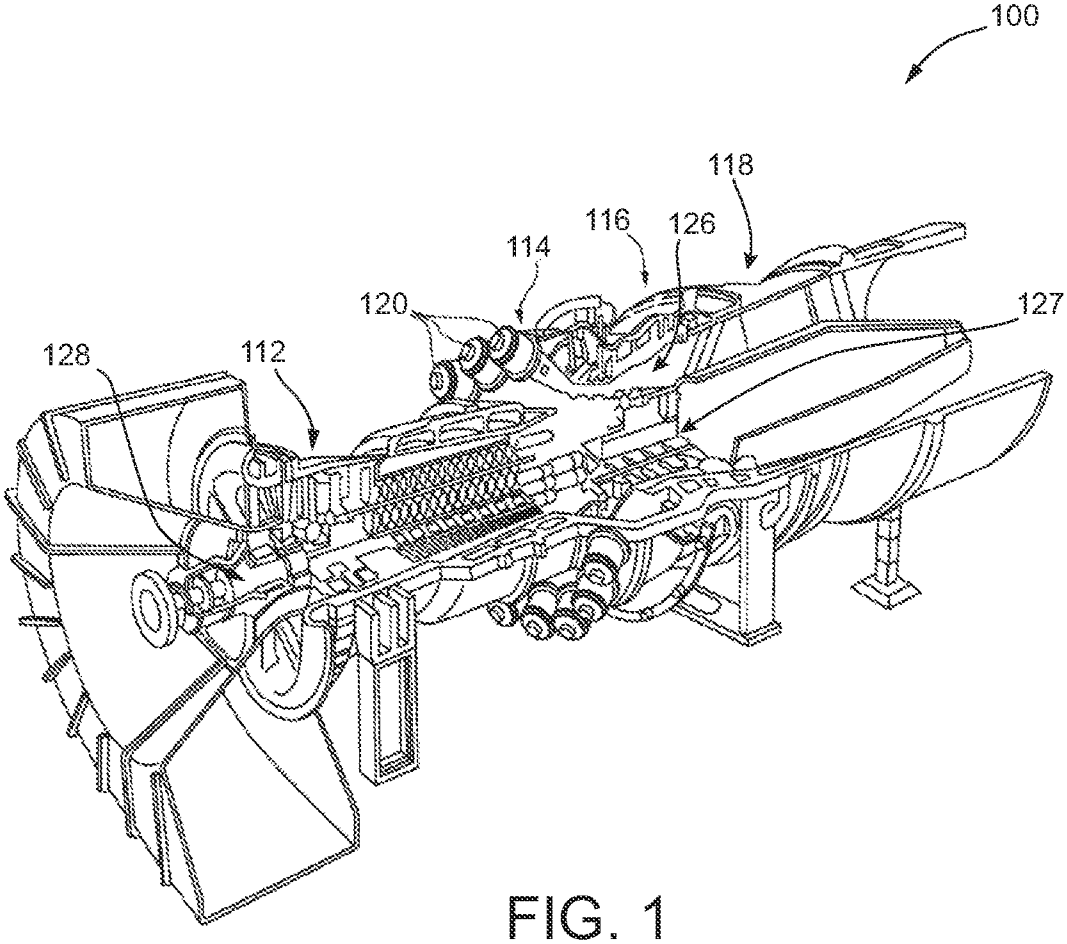
FIG. 1 is a perspective cross-sectional view of an exemplary gas turbine engine.

Although the embodiments of the disclosure are described with reference to these specific preferred embodiments, it will be understood that the invention is not limited to these preferred embodiments. But to the contrary, the invention includes numerous alternatives, modifications and equivalents and it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

DETAILED DESCRIPTION

In the following specification and the claims, reference will be made to a number of terms, which shall be defined to have the following meanings:

The singular forms "a," "an," "the," and "said" include plural references unless the context clearly dictates otherwise. The terms "comprising," "including," and "having" are intended to be inclusive and mean that there may be additional elements other than the listed elements. "Optional" or "optionally" means that the subsequently described event or circumstance may or may not occur, and that the description includes instances where the event occurs and instances where it does not.

References to "one embodiment" are not intended to be interpreted as excluding the existence of additional embodiments that also incorporate the recited features. Moreover, although specific features of various embodiments described herein may be shown in some drawings and not in others, this is for convenience only. In accordance with the principles of the present disclosure, any feature of a drawing and/or embodiment described herein may be referenced and/or claimed in combination with any feature of any other drawing and/or embodiment described herein. Furthermore, unless explicitly stated to the contrary, embodiments "including" or "having" an element or a plurality of elements having a particular property may include additional such elements not having that property.

As used herein, the term "real-time" refers to either the time of occurrence of the associated events, the time of measurement and collection of predetermined data, the time to process the data, or the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated circuit, and/or other programmable circuits, and such terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, for example, but not be limited to, a scanner. Furthermore, in the embodiments described herein, additional output channels may include, but are not limited to only being, an operator interface monitor.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

In one embodiment, a repair method to salvage mis-machined parts by repairing the parts using a combination of a fishbone braze foil and a spring-like locking insert is provided. In the exemplary method, a surface (e.g., a slot) to be repaired is identified, and a fishbone braze foil is fabricated based on the dimensions of the slot or other surface identified. The exemplary fishbone braze foil is variably sized to extend across the entire inside surfaces of the slot. For example, the fishbone braze foil may be variably sized to enable the foil to extend across the bottom and both sides of the surfaces defining the slot, after the braze foil is inserted into the slot.

In one embodiment, the method includes machining a spring-like locking insert based on the dimensions of the slot. For example, the spring-like locking insert may have a width, length, and thickness variably selected to enable the spring-like locking insert to fit snugly against the inside of the walls defining the slot. When the spring-like locking insert is fully inserted into the bottom of the slot, a click may be heard as it snaps into proper position. Once fully inserted as such, in the exemplary embodiment, generally the spring-like locking insert may not be removed from the slot without using a tool.

In another embodiment, the repair method may include positioning the fishbone braze foil over and into the C-seal slot such that the slot is fully covered with the foil. In one embodiment, a braze paste may be applied along an inside surface of the spring-like locking insert. The spring-like locking insert, in the exemplary embodiment, is positioned across and on top of the fishbone braze foil and is inserted into the slot together with the foil. In one embodiment, additional braze paste may be applied along a gap defined between the spring-like locking insert and the base metal. In one exemplary implementation, the insert is brazed in a vacuum furnace. After brazing, the repair method may include re-machining the C-seal slot to meet industry requirements.

While implementations are described herein in terms of repairing a slot, such of that of a C-seal slot, the processes described herein may be applied to other grooves and/or surfaces, requiring repair, of an engine or any other type of machine component.

Turning to the figures, FIG. 1 is a perspective, cross-sectional view of an exemplary gas turbine engine 100. In the exemplary embodiment, the engine 100 includes a compressor section 112, a combustor section 114, a turbine section 116, and an exhaust section 118. In the exemplary embodiment, the combustor section 114 includes a plurality of combustors 120 that each include a combustion shell and a cover plate. A combustor liner, or basket 126, and transition duct 127 define a passage that conveys hot working gases to flow towards the turbine section 116. The present invention is operable with any other known combustor geometry and/or any other gas turbine engine designs, including, but not limited to, can, can-annular or annular construction combustors in stationary land-based and/or vehicular applications.

During operation of the engine 100, compressed air from the compressor section 112 is provided to the combustor section 114 where it is combined with fuel supplied by a fuel injection system 128 in the combustor section 114. The fuel/air mixture is ignited to form combustion products that make up hot working gases. It may be understood that combustion of the fuel and air may occur at various axial locations along the passage through the combustor liner or basket 126 and the transition duct 127 to the inlet of the turbine section 16. The hot working gases expand through the turbine section 116 and are exhausted through the exhaust section 118.

Figure 2:
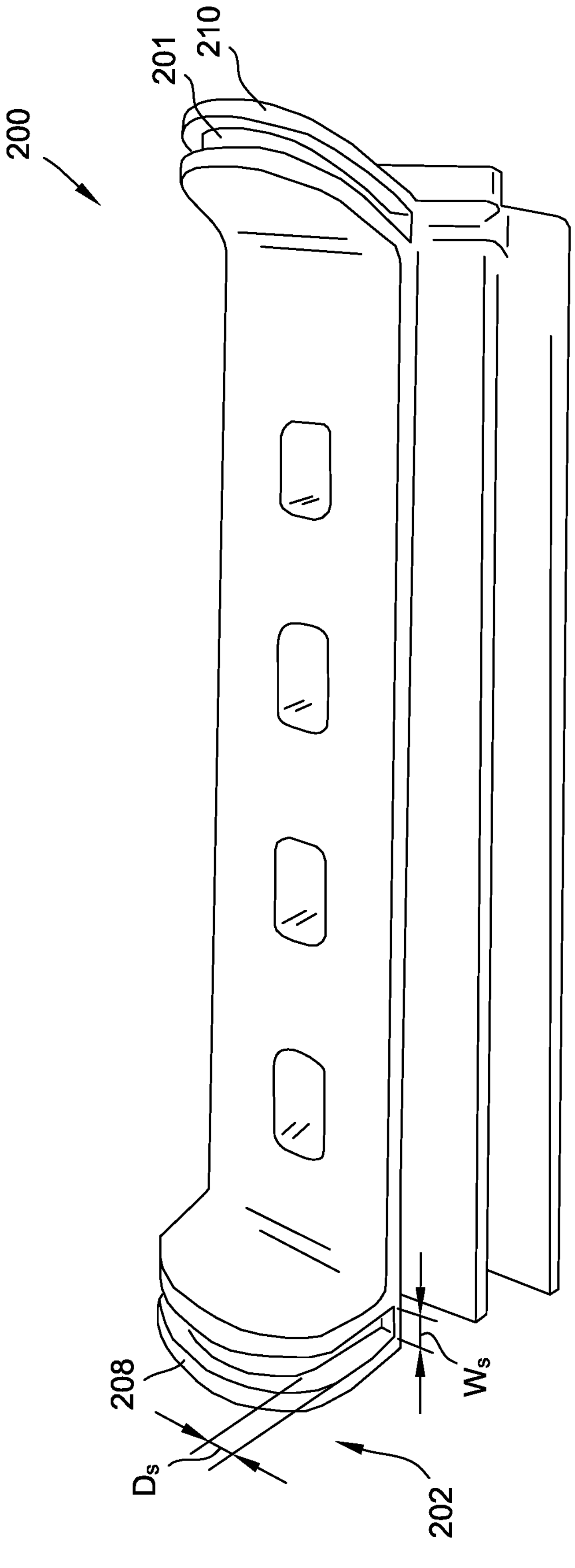
FIG. 2 shows a perspective view of an exemplary component that includes C-seal slot that may be used with a gas turbine engine, such as the gas turbine engine of FIG. 1.

FIG. 2 is a perspective enlarged view of an exemplary turbine component 200 that includes a C-seal slot 202. In the example, the slot 202 is a slot that has been mis-machined or that has become damaged. Alternatively, the method and systems described herein may be used with any other component, including any other type of component that may be used in the turbine engine 100 shown in FIG. 1. In the exemplary embodiment, the slot 202 is defined by a bottom surface 201, and a pair of opposed side wall surfaces 206 and 208. As such, the slot 202 has a depth $D_s$ measured to the bottom surface 201 from the outer surface 210 of the component 200, and a width $W_s$ measured between the opposed surfaces 206 and 208 of the slot 202.

Figure 3:
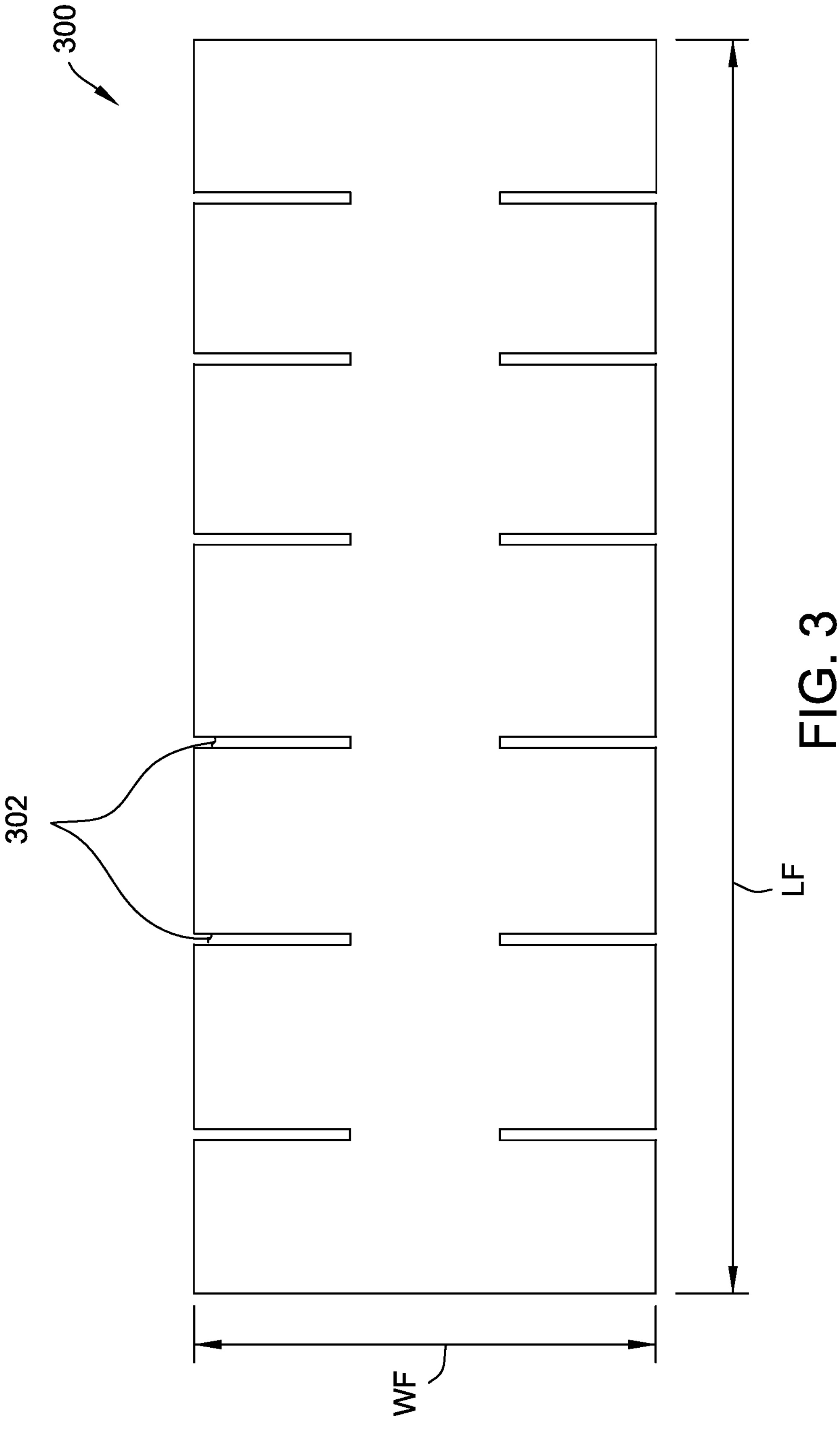
FIG. 3 illustrates an implementation of an exemplary fishbone braze foil.

FIG. 3 illustrates an exemplary implementation of a braze foil 300 that may be used to repair the component 200 shown in FIG. 2. In the exemplary embodiment, the braze foil 300 is a fishbone braze foil that includes a plurality of slits 302 defined within it. Alternatively, any other braze foil that enables the repair methods described herein to function may be used. In the exemplary embodiment, the slits 302 cooperate to enable the braze foil 300 to readily conform to the inner dimensions, i.e., the width $W_s$, of a slot to be repaired, such as the slot 202 shown in FIG. 2. More particularly, the braze foil 300 may be variably sized to enable the foil 300 to extend across, and to fully cover, the slot being repaired, after the foil 300 is fully inserted within the slot 202. For example, in the exemplary embodiment, if slot 202 is being repaired, the foil 300 is sized to enable the foil 300 to fully cover the bottom surface 201 (shown in FIG. 2) and the inner surfaces of the walls 206 and 208 defining the slot 202. In other words, the foil 300 has a width $W_f$, and a length $L_f$ that enables the foil 300 to completely cover the surfaces, i.e., surface 201, that define the slot 202 being repaired. In other embodiments, the foil width $W_f$, and a length $L_f$ are selected to enable the portion of a component being repaired to be completely covered by the foil 300 during the repair process.

Figure 4:
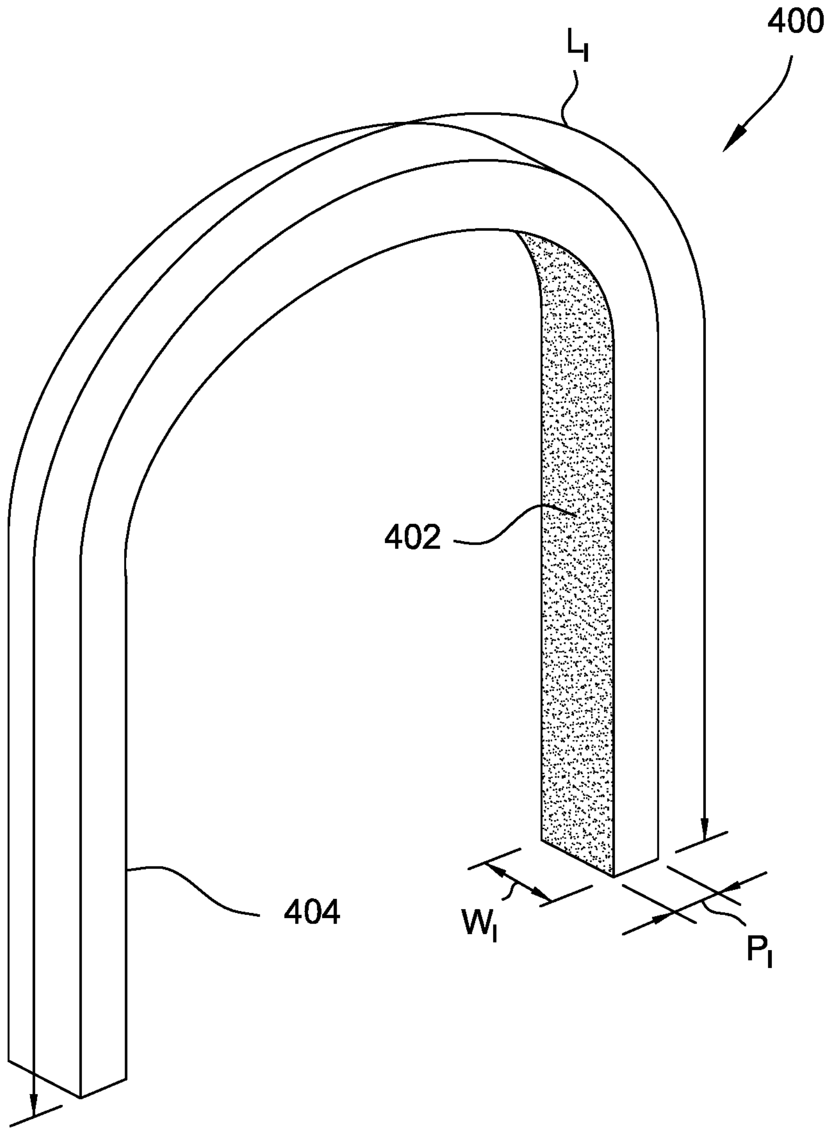
FIG. 4 is side view of an exemplary spring-like locking insert that that has been machined to fit inside of a slot, such as the C-slot shown in FIG. 2, such that the insert extends over a fishbone braze foil, such as the foil shown in FIG. 3.

FIG. 4 is side perspective of an exemplary spring-like locking insert 400 that that has been machined with dimensions selected to enable the insert 400 to fit snuggly and in a tight tolerance within a mis-machined slot, such as the slot 202 shown in FIG. 2. More specifically, the locking insert 400 is machined with a variably selected width $W_i$, thickness $T_i$, and length $L_i$, that enables the insert 400 to extend completely across and within the slot 202 being repaired. As such, in the exemplary embodiment, when used to repair a C-seal slot, the combination of the material used in fabricating the locking insert 400 and the dimensions $W_i$, $T_i$, and $L_i$, of the locking insert 400 enable the insert 400 to snap or click when the spring-like locking insert 400 is fully inserted into and against the bottom surface 201 of the slot 202 being repaired. Once fully positioned, in the exemplary embodiment, the friction fit between the locking insert 400 and the slot 202 being repaired enables the spring-like locking insert 400 to remain in position without the use of a tool and/or any fastening hardware or adhesive material.

In the exemplary embodiment, a braze paste 402 that has been applied across an inside surface 404 of the spring-like locking insert 400. More specifically, in the exemplary embodiment, the braze paste 402 has been applied such that the paste 402 is between the locking insert 400 and the bottom surface 201 of the slot 202 being repaired. In alternative embodiments, the braze paste 402 may be applied in different locations than is shown in FIG. 4 and/or may be applied to other surfaces of the locking insert 400. In the exemplary embodiment, the paste 402 is a nickel-based or cobalt-based paste, such as, but not limited to, BNi-2 (MBF20), BNi-3 (MBF30), BNi-5b (MBF31), BNi-6 (MBF60), BNi-9 (MBF80), and/or DF4B. Alternatively, any other brazing alloy may be used that provides a high strength, that is braze compatible with the type of material used in fabricating the turbine component, and that enables the insert 400 and the repair methods described herein to function as described herein.

In the exemplary embodiment, a braze paste 402 that has been applied across an inside surface 404 of the spring-like locking insert 400. More specifically, in the exemplary embodiment, the braze paste 402 has been applied such that the paste 402 is between the locking insert 400 and the bottom surface of the slot being repaired. In alternative embodiments, the braze paste 402 may be applied in different locations than is shown in FIG. 4 and/or may be applied to other surfaces of the locking insert 400. In the exemplary embodiment, the paste 402 is a nickel-based or cobalt-based paste, such as, but not limited to, BNi-2 (MBF20), BNi-3 (MBF30), BNi-5b (MBF31), BNi-6 (MBF60), BNi-9 (MBF80), and/or DF4B. Alternatively, any other brazing alloy may be used that provides a high strength, that is braze compatible with the type of material used in fabricating the turbine component, and that enables the insert 400 and the repair methods described herein to function as described herein.

Figure 5:
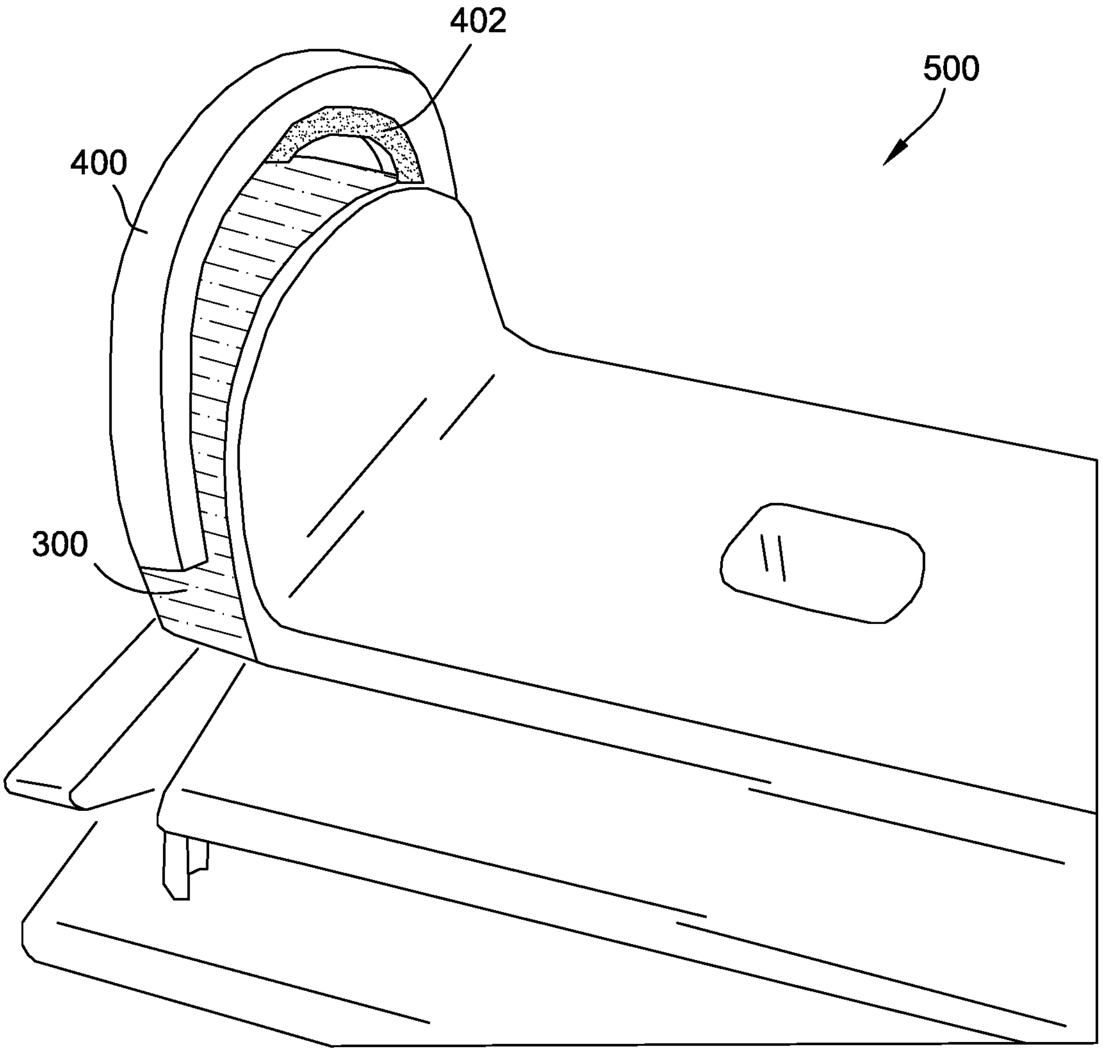
FIG. 5 is a perspective view illustrating the fishbone braze foil being positioned over and into the C-seal slot in order to cover the slot with the foil, and such that the spring-like locking insert is positioned over the foil.
Figure 6:
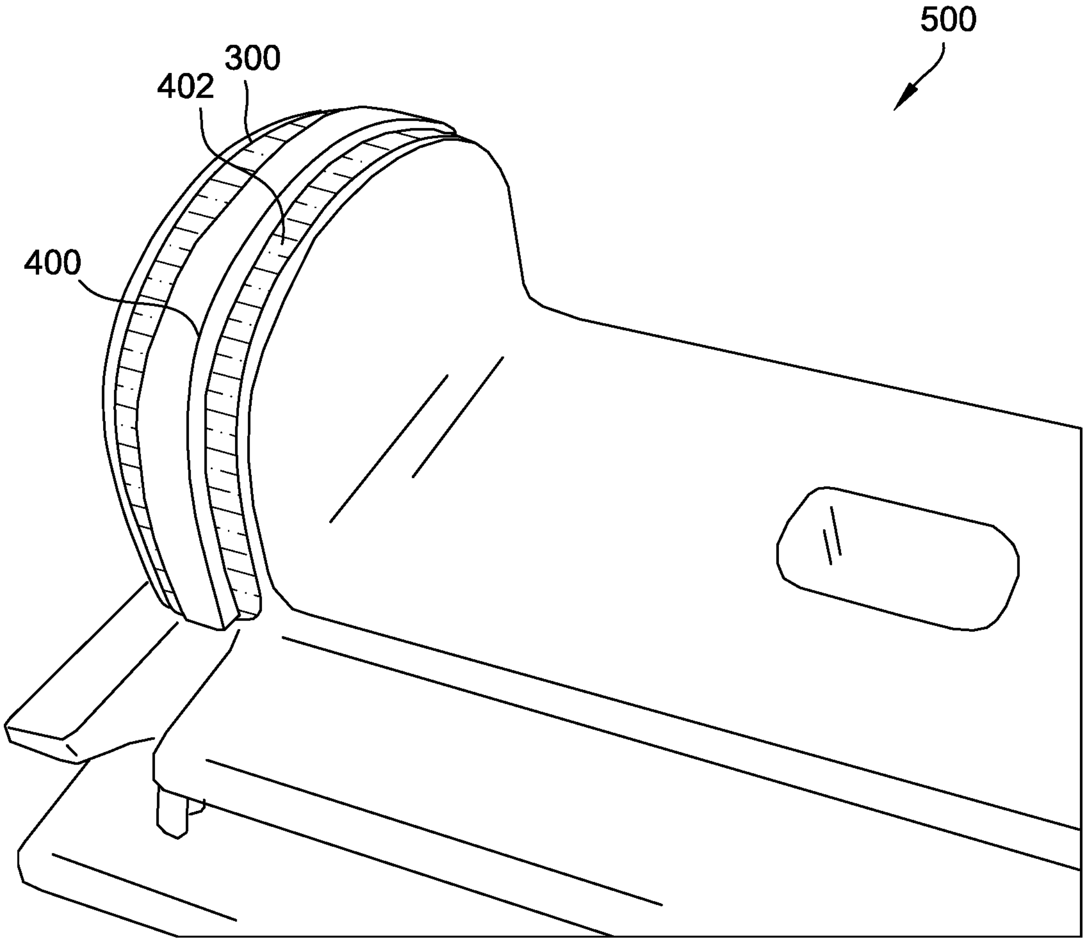
FIG. 6 shows a perspective view of the spring-like locking insert shown in FIG. 5 and fully inserted within the C-slot with the foil.

FIG. 5 is a perspective view illustrating the fishbone braze foil 300 being positioned over and entering the C-seal slot 202 to cover the slot 202 completely with the foil 300, and such that the spring-like locking insert 400 may be positioned over the foil 300. FIG. 6 shows a perspective view of the spring-like locking insert 400 shown in FIG. 5 and fully inserted within the C-slot 202 with the foil 300. In the exemplary view, braze foil 300 is selected and sized to extend over and across a C-seal slot being repaired, such as the slot 202 shown in FIG. 2, such that the slot 202 being repaired is completely covered with the foil 300. A spring-like locking insert 400 is positioned across the top of the fishbone braze foil 300, and the spring-like locking insert 400 is pressed into the slot 202 being repaired, together with the foil 300 and with any braze paste 402 that has been applied to the locking insert 400. Additional braze paste (not shown) may be applied along any gaps defined between the spring-like locking insert 400 and the component being repaired (e.g., along the sides of the slot being repaired). The component 500 being repaired, may then be brazed in a vacuum furnace such that the locking insert 400 is securely coupled via the brazing process within the slot being repaired. It should be noted that in each embodiment, the locking insert and the braze foil are braze compatible with the type of material used in fabricating the turbine component.

Figure 7:
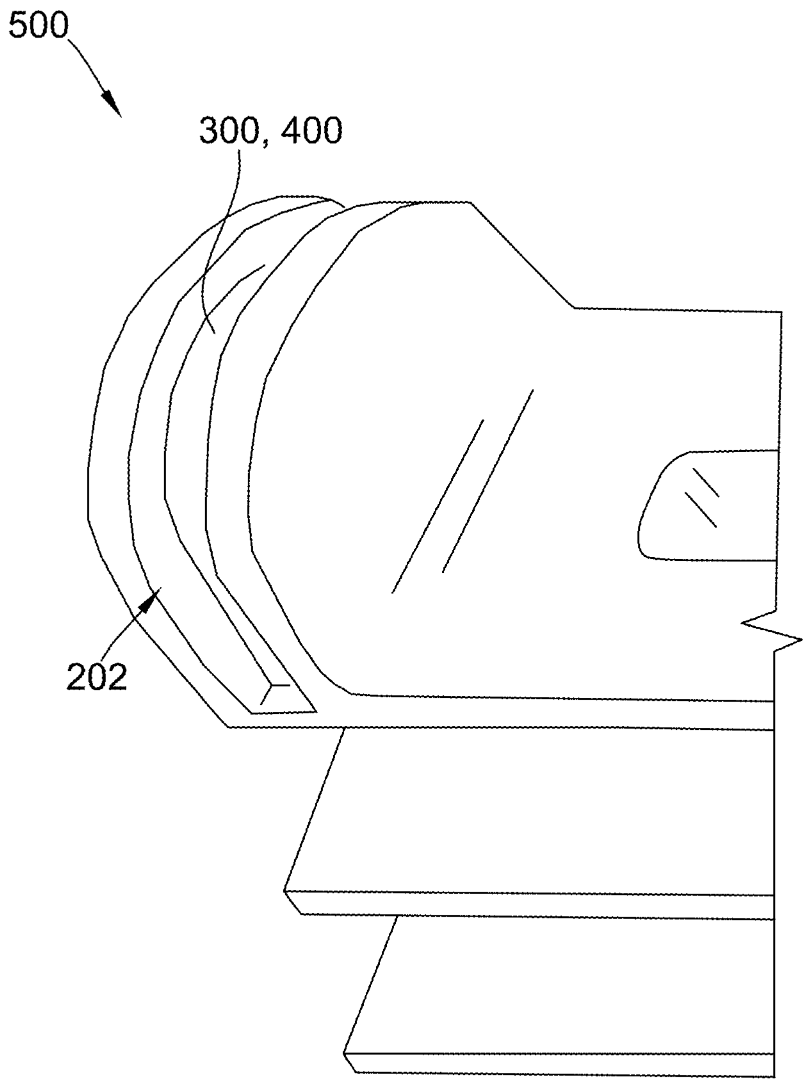
FIG. 7 is a perspective view of an exemplary C-slot that has been repaired using the spring-like locking insert and fishbone braze foil shown in FIG. 6.

Following the brazing process, and as shown in FIG. 7, the spring-like locking insert 400 and the fishbone braze foil 300 have been bonded together and are securely coupled within the slot 202 of component 500 being repaired. A post brazing inspection may be performed to determine whether and/or how much of the slot 202 being repaired requires additional machining to be returned to a component having a slot with desired dimensions. Because the slot 202 has been repaired, the costs of replacing the component 500 with a newer component are facilitated to be reduced.

Figure 8:
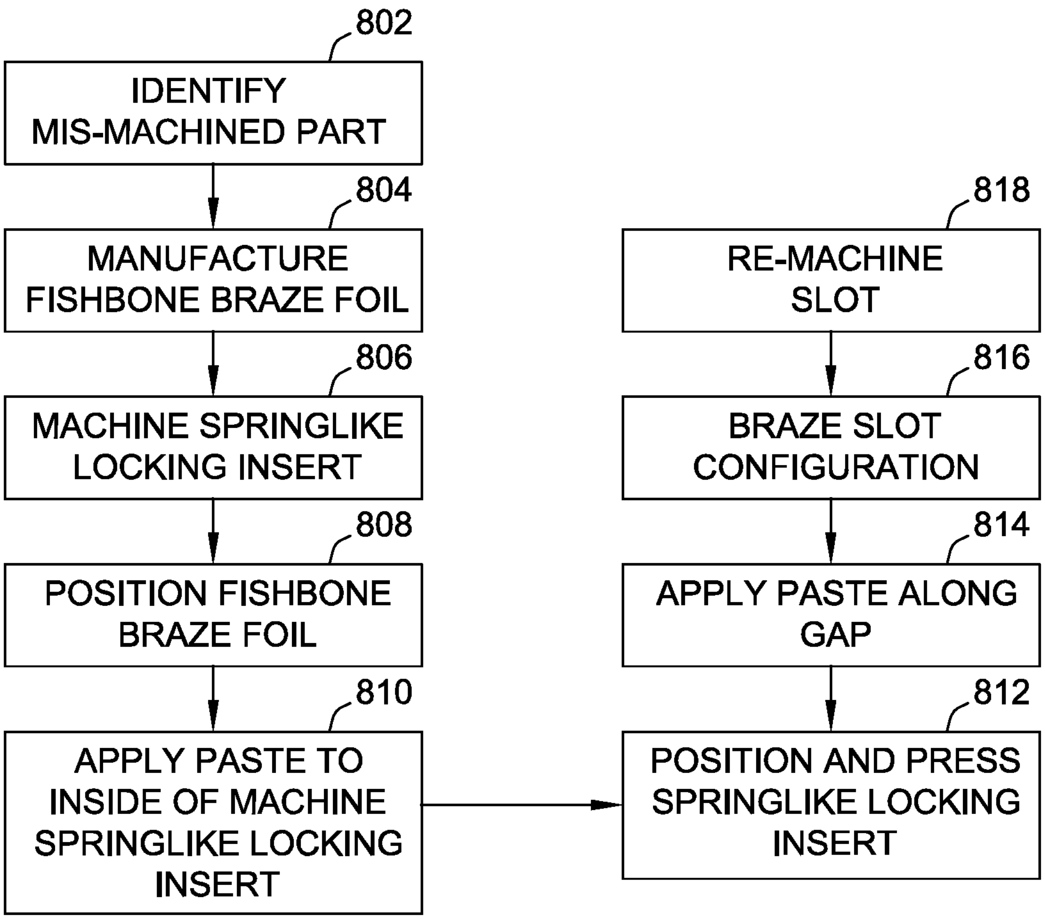
FIG. 8 is a flow diagram of an exemplary method of repairing mis-machined parts using a combination of a fishbone braze foil and a spring-like locking insert.

FIG. 8 is a flow diagram of an exemplary method 800 of salvaging mis-machined parts by repairing the parts using a combination of a fishbone braze foil and a spring-like locking insert. Turning more particularly to the flow diagram, in the exemplary method 800, initially a surface (e.g., a component including a slot) to be repaired is identified 802. For example, in one embodiment a technician may identify a mis-machined part, such as the slot 202 (shown in FIG. 2). In another embodiment, an automated procedure includes an inspection device that is coupled to a processor that is used to identify whether components require repair.

A fishbone braze foil, such as the foil 300 (shown in FIG. 3), may be manufactured 804 based on the measured dimensions of the slot being repaired and/or based on another surface or portion of a component to be repaired. In the exemplary embodiment, the foil is variably sized and selected to enable the foil 300 to extend across the entire inner surfaces, including the slot bottom and the opposed sides, that define the slot. For example, the fishbone braze foil may be variably sized to extend fully across the bottom surface and both opposed sides of the surface after the foil is forced into the slot being repaired.

Moreover, in the exemplary method 800, a spring-like locking insert is machined 806 based on the measured dimensions of the slot being repaired. For example, the spring-like locking insert 400 shown in FIG. 4 may have width $W_i$, thickness $T_i$, and length $L_i$, that are variably selected to ensure that the insert 400 fits snuggly, i.e., in tight tolerance, against the surfaces defining the slot, i.e., against the inner surfaces of the walls defining the slot being repaired. When the spring-like locking insert is fully inserted within the slot and is pushed firmly against the bottom of the slot, a click may be heard as the insert snaps in place. Once positioned as such, the spring-like locking insert may be sized such that it may not be removed from the slot being repaired without the use of a tool.

The fishbone braze foil may be positioned 808 fully across and into the C-seal slot to ensure that the entire surfaces defining the slot to be repaired are each covered with the foil. For example, the fishbone braze foil 300 shown in FIG. 5 is positioned fully across and into the C-seal slot such that the slot is fully covered with the foil 300.

In one embodiment, a braze paste may be applied 810 across an inside surface of the spring-like locking insert used in the repair process. For example, the braze paste 402 shown FIG. 4 may be applied across the inside surface of the spring-like locking insert 400 such that the braze paste will be between the locking insert and the bottom surface of the slot being repaired.

The spring-like locking insert is placed 812 across the top of the fishbone braze foil and is forced into the slot concurrently with the foil. For example, the spring-like locking insert 400 shown in FIG. 5 is placed on top of the fishbone braze foil 300 and pressed into the slot being repaired together with the foil 300. In one embodiment, additional braze paste 402 may be applied 814 across any gaps defined between the spring-like locking insert and the base metal.

The component is then brazed in a vacuum furnace. After brazing, the slot may be re-machined to meet desired requirements.

Benefits of an implementation may increase productivity by virtue facilitating repairs without having to recase an entire part. Waste in the form of time and physical resources may be facilitated to be avoided by not having to discard an entire turbine part. In so doing, the processes described herein are more environmentally conscious.

Further aspects of the present disclosure are provided by the subject matter of the following clauses:

A method of repairing a component includes providing a braze foil variably sized to fit within at least a portion of a slot of a component being repaired, positioning a locking insert proximate to the braze foil, pressing the braze foil and the locking insert into at least the portion of the slot being repaired, such that the locking insert is securely coupled within the portion of the slot being repaired via a friction fit, and brazing the braze foil and the locking insert together in the slot.

The method in accordance with any of the preceding clauses wherein providing a braze foil further comprises fabricating a fishbone braze foil.

The method in accordance with any of the preceding clauses further including identifying at least a portion of a turbine component to be repaired.

The method in accordance with any of the preceding clauses further including identifying that the slot has been mis-machined or has been damaged.

The method in accordance with any of the preceding clauses further including applying a braze paste across at least a portion of the locking insert such that when the locking insert is in position to be brazed to the component being repaired, the braze paste is between the inner surface of the locking insert and at least a portion of the component being repaired.

The method in accordance with any of the preceding clauses further including applying a braze paste within a gap defined between the locking insert and an edge of the slot, after the locking insert has been fully inserted within the portion of the slot being repaired.

The method in accordance with any of the preceding clauses further including positioning the locking insert further comprises manufacturing a spring-like locking insert.

The method in accordance with any of the preceding clauses further including re-machining the slot after the locking insert and the braze foil have been brazed in position within the component being repaired.

A repair kit for use with a machined component that includes a slot, wherein at least a portion of the slot is damaged or has been mis-machined, wherein the repair kit includes a braze foil configured to fit within at least a portion of the slot being repaired, and a locking insert sized to be positioned proximate the braze foil, such that when the locking insert and the braze foil are pushed into at least the portion of the slot being repaired, the braze foil extends completely across any portion of the surface defining the portion of the slot being repaired prior to the braze foil and the locking insert being brazed concurrently in the slot.

The repair kit in accordance with any of the preceding clauses wherein the braze foil comprises a fishbone braze foil.

The repair kit in accordance with any of the preceding clauses wherein the component to be repaired is a turbine component, and wherein the braze foil and the locking insert are braze compatible with the material used in fabricating the turbine component.

The repair kit in accordance with any of the preceding clauses further including a braze paste applied between the locking insert and the braze foil such that the braze paste extends between the inner surface of the locking insert and the portion of the component being repaired prior after the locking insert has been positioned fully against the portion of the component being repaired.

The repair kit in accordance with any of the preceding clauses wherein the braze paste is applied between the inner surface of the locking insert and the bottom surface of the slot being repaired.

The repair kit in accordance with any of the preceding clauses further including a braze paste applied on a gap defined between the locking insert and an edge of the slot after the locking insert is fully positioned against the portion of the component being repaired.

The repair kit in accordance with any of the preceding clauses wherein the locking insert comprises a spring-like locking insert.

The repair kit in accordance with any of the preceding clauses wherein the slot with the locking insert is re-machined after the locking insert and the braze foil has been brazed together within the slot being repaired.

A method of repairing a turbine component includes providing a braze foil variably sized to fit within at least a portion of a slot defined within the turbine component being repaired, positioning the braze foil to extend across the portion of the slot to be repaired, and positioning a locking insert against the braze foil. The method also includes forcing the braze foil and the locking insert simultaneously into at the portion of the slot being repaired, such that the locking insert is securely coupled within the portion of the slot being repaired via a friction fit, and such that the braze foil extends completely across the surfaces defining the portion of the slot being repaired, and brazing the braze foil and the locking insert simultaneously in the portion of the slot being repaired.

The method in accordance with any of the preceding clauses wherein brazing the braze foil and the locking insert simultaneously further includes inserting the turbine component to be repaired within a vacuum furnace, and brazing the braze foil and the locking insert within the portion of the slot being repaired.

The method in accordance with any of the preceding clauses further including applying a braze paste across an inner surface of the locking insert prior to inserting the locking insert against the braze foil and into the portion of the slot being repaired, such that the braze paste is between the locking insert and a bottom surface defining the portion of the slot being repaired.

The method in accordance with any of the preceding clauses further including applying the braze paste across a gap defined between the locking insert and the outer surface of the component being repaired, after the locking insert has been fully inserted within the portion of the slot being repaired.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The methods and systems described herein are not limited to the specific embodiments described herein. For example, components of each system and/or steps of each method may be utilized independently and separately from other components and/or steps described herein. For example, the method and systems may also be used in combination with other combustion systems and are not limited to practice only with the gas turbine engines as described herein. Rather, the exemplary embodiment can be implemented and utilized in connection with many other rotary machine and combustion applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of repairing an originally formed slot that was mis-machined in the fabrication of a component or an originally formed slot that was damaged during an operation of the component, said method comprising:

providing a braze foil variably sized to fit inside the originally formed slot that was mis-machined or damaged, the braze foil including a plurality of slits to facilitate the conforming of the braze foil inside the originally formed slot that was mis-machined or damaged;

applying a braze paste across at least a portion of a locking insert and positioning the locking insert proximate to the braze foil such that when the locking insert is in position to be brazed to the originally formed slot that was mis-machined or damaged, the applied braze paste is positioned between an inner surface of the locking insert and at least a portion of the originally formed slot that was mis-machined or damaged;

pressing the braze foil and the locking insert into the originally formed slot that was mis-machined or damaged, such that the locking insert is securely coupled within the originally formed slot that was mis-machined or damaged slot via a friction fit; and brazing the braze foil and the locking insert together in the originally formed slot that was that was mis-machined or damaged; and re-machining a new slot in the component after the locking insert and the braze foil have been brazed in position within the originally formed slot that was mis-machined or damaged.

2. The method of claim 1, wherein the braze foil includes a width $W_f$, and a length $L_f$ that is sized to enable the braze foil to completely cover surfaces which define the originally formed slot that was mis-machined or damaged.

3. The method of claim 1, wherein the component is a turbine component.

4. The method of claim 3, further comprising identifying a material for the braze foil and a material for the locking insert that is compatible with a material used in fabricating the turbine component.

5. The method of claim 1, further comprising applying a braze paste within a gap defined between the locking insert and an edge of the originally formed slot that was mis-machined or damaged, after braze foil and the locking insert have been pressed into the originally formed slot that was mis-machined or damaged.

6. The method of claim 1, wherein positioning the locking insert further comprises snapping the locking insert into the originally formed slot that was mis-machined or damaged.

7. The method of claim 1, wherein the locking insert includes at least one variably selected width $W_i$, thickness $T_i$, or length $L_i$, to enable the locking insert to extend completely across and within the originally formed slot that was mis-machined or damaged.

8. The method of claim 1, further comprising inserting the component to be repaired within a vacuum furnace prior to the brazing of the braze foil and the locking insert.

9. The method of claim 1, wherein providing a braze foil comprises providing a braze foil having a longitudinal length dimension and a lateral width dimension that is less than the longitudinal length direction, and wherein the plurality of slits extend perpendicularly to the longitudinal length dimension.

10. The method of claim 1, wherein providing a braze foil comprises providing a braze foil having a longitudinal length dimensions and a lateral width dimension that is less than the length direction, and wherein the plurality of slits extend axially across the lateral width dimension for a distance less than the lateral width dimension.

11. The method of claim 1, wherein providing a braze foil comprises providing an elongated braze foil having parallel longitudinal side edges, and wherein the plurality of slits are arranged as aligned opposing pairs of slits respectively extending from the longitudinal side edges toward one another.

12. The method of claim 1, wherein the originally formed slot that was mis-machined or damaged is a curved slot in the component.

13. The method of claim 1, wherein the originally formed slot that was mis-machined or damaged slot is a C-seal slot of a gas turbine engine component.

* * * * *